3,551,292
PROCESS OF PRODUCING L-GLUTAMIC ACID BY FERMENTATION
Akira Kamimura, Kawasaki-shi, and Ryuichiro Tsugawa and Shinji Okumura, Tokyo, Japan, assignors to Ajinomoto Co., Inc., and Sanraku Ocean Co., Ltd., both of Tokyo, Japan
No Drawing. Filed Feb. 20, 1968, Ser. No. 706,774
Claims priority, application Japan, Feb. 28, 1967, 42/12,723
Int. Cl. C12b 1/00
U.S. Cl. 195—30         5 Claims

ABSTRACT OF THE DISCLOSURE

The yield of L-glutamic acid from an aqueous fermentation medium containing acetate ions as the principal carbon source and microorganisms capable of producing glutamic acid from such a carbon source may be increased significantly by the addition of an assimilable sulfur source to the medium. Suitable sources include cystine, cysteine, homocystine, homocysteine, methionine, thioglycolic acid, β-mercaptoethanol, and thiourea, and are employed at initial concentrations of 0.005% to 2%, preferably 0.05 to 0.5%.

---

This invention relates to the production of L-glutamic acid by microbial fermentation, and particularly to the production of L-glutamic acid from a nutrient medium containing acetate ions as the principal source of carbon.

It is known that many microorganisms are capable of producing L-glutamic acid by aerobic fermentation of nutrient media containing acetate ions as the principal carbon source (T. Tsunoda et al., J. Gen. Appl. Microbiol. 7 (1961) 18; Tanaka et al., U.S. Pat. No. 3,335,065 and French Pat. No. 1,424,809; U. A. Phillips, U.S. Pat. No. 3,277,625). As compared to procedures employing sugars as carbon sources, the rate of glutamic acid formation from acetate ions is rather slow, and the ultimate yields are significantly lower.

We have now found that the known process can be substantially improved by adding to the nutrient medium employed a source of assimilable sulfur in an amount much greater than the sulfur traces provided by sulfur bearing amino acids and the like in such conventional nutrients as protein hydrolyzates, yeast extract, or corn steep liquor. The compounds most effective in stimulating the production of glutamic acid from acetate ions are the sulfur-bearing amino acids cystine, cysteine, methionine, homocystine, homocysteine, but substantial improvements are also achieved with very different organic sulfur-bearing compounds, such as thioglycolic acid, β-mercaptoethanol, and thiourea. Both optically active L-forms and inactive DL-forms of the sulfur-bearing amino acids may be employed.

The lower limit of effectivness of the sulfur sources appears to depend entirely on the sensitivity of the analytical method employed for detecting the effect. Practically significant results are obtained when the nutrient medium contains only 0.005% (by weight) of the sulfur source. Greatest improvement is achieved at concentrations of 0.05 to 0.5%. At higher concentrations, the cost of the sulfur source tends to offset the higher glutamic acid yields, and at concentrations greater than 2%, the yields of glutamic acid again decrease. Measurable improvement, however, can be detected at much higher concentrations. The effect of the sulfur-bearing compounds is cumulative within the preferred ranges, so that several compounds may be employed jointly in mixtures.

An effective concentration of sulfur-bearing compounds cannot be achieved in the conventional nutrient media by merely increasing the ingredients which normally provide trace amounts of assimilable sulfur, such as the protein hydrolyzates and other supplemental nutrients referred to above. It appears that the relatively large amounts of amino acids free from sulfur which are introduced into the nutrient media by the necessary amounts of protein hydrolyzates have an inhibiting effect which by far outweighs any benefits that could be obtained from the increased sulfur supply.

The composition of the basic nutrient media prior to modification according to this invention may be entirely conventional. They should contain a source of assimilable carbon mainly constituted by acetate ions, a source of assimilable nitrogen, organic growth promoters, and the inorganic ions necessary for microbial growth. The acetate ions may be supplied by alkali metal or ammonium salts of acetic acid or by the free acid. When ammonium acetate is employed as a source of carbon, it simultaneously supplies nitrogen.

All microorganisms known to produce L-glutamic acid from acetate ions as the principal carbon source respond to the addition of sulfur-bearing compounds according to this invention in substantially the same manner. As will partly be illustrated hereinbelow, all tested strains of Micrococcus, Corynebacterium, Brevibacterium, and Arthrobacter which produce L-glutamic acid from acetate ions in the absence of the sulfur bearing compounds of the invention produce glutamic acid at a faster rate and to higher ultimate concentrations when the sulfur-bearing compounds are present. These benefits are not lost if the acetate ions are replaced in part with sugars as a carbon source.

It is normally preferred to operate at relatively low initial acetate ion concentrations, and to replenish and increase the acetate content of the nutrient medium during the growth period of the microorganisms, the additions starting approximately in the middle of the logarithmic phase, and to keep the pH between 7.0 and 8.5 by the added material.

The following examples are further illustrative of this invention, but it will be understood that the invention is not limited thereto.

EXAMPLE 1

An aqueous nutrient medium was prepared to the following composition:

Ammonium acetate: 2.0%
$KH_2PO_4$: 0.1%
$MgSO_4 \cdot 7H_2O$: 0.04%
$Fe^{++}$, $Mn^{++}$ (each): 2 p.p.m.
Thiamine hydrochloride: 200 γ/liter
Biotin: 2.0 γ/liter
Casamino acid (DIFCO): 0.2%
pH: 7.5

The casamino acid employed was free from vitamins and contributed to the medium 91 g./100 ml. of amino acids (total nitrogen 14 mg./100 ml.), including 0.026 mg./100 ml. L-cystine and 2.8 mg./100 ml. L-methionine.

Three 20 ml. batches (A, B, C) of the medium were sterilized in 500 ml. shaking flasks (Sakaguchi type) after 0.015% L-cystine had been added to batches B and C, and additionally 0.005% L-methionine to batch C. The three media were inoculated with *Brevibacterium lactofermentum* No. 2256 (ATCC 13869) which had been cultured on bouillon agar slants for 24 hours, and shaken for 10–24 hours at 31° C. The L-glutamic acid content of batch A after 10 and 24 hours respectively was 2.5 and 3.7 mg./ml. The corresponding values for batch B were 3.2 and 5.3 mg./ml., and for batch C, 3.3 and 5.6 mg./ml. Addition of the sulfur bearing amino acids raised the glutamic acid yield by approximately one half.

EXAMPLE 2

An aqueous nutrient medium was prepared to the following composition:

Ammonium acetate: 2.0%
Glucose: 1.0%
$KH_2PO_4$: 0.1%
$MgSO_4 \cdot 7 H_2O$: 0.04%
$Fe^{++}$, $Mn^{++}$ (each): 2 p.p.m.
Thiamine hydrochloride: 200 γ/liter
Biotin: 2.0 γ/liter
Soybean protein hydrolyzate (Aji-eki): 1.0 ml./dl.
pH: 7.5

The Aji-eki, a commercial product, contributed 0.9 mg./100 ml. L-cystine and 0.8 mg./100 ml. L-methionine. Three batches of this medium respectively containing no additional cystine and methionine, added cystine, and added cystine and methionine were inoculated with the same microorganism as described in Example 1, and the culture media were analyzed for L-glutamic acid content after 15 hours of cultivation. 9.0, 10.6, and 12.8 mg. L-glutamic acid per milliliter of the medium were found respectively.

EXAMPLE 3

Eight flasks containing the culture medium of Example 1 and varying amounts of cystine were inoculated and cultured aerobically as described in Example 1. The L-glutamic acid content of each medium was determined after 15 hours with the following results:

| Added L-cystine (mg./dl.) | 0 | 3 | 5 | 15 | 15 | 500 | 1,000 | 2,000 |
|---|---|---|---|---|---|---|---|---|
| L-glutamic acid (mg./ml.) | 2.6 | 3.0 | 3.1 | 3.4 | 3.7 | 3.9 | 3.8 | 3.4 |

Significant improvement in the glutamic acid yield is thus achieved at all tested concentrations of cystine, the yield exceeding 3.0 mg./ml. from 0.005% to 2% cystine in the nutrient medium. From an economic point of view, the most desirable results are achieved at cystine concentrations of 0.05–0.5% (5–500 mg./dl.), as discussed above.

EXAMPLE 4

The eight compounds listed in Table 1, which are sources of assimilable sulfur for the microorganisms employed, were added in the concentrations indicated to respective batches of a nutrient medium which differed from that described in Example 1 by slightly lower contents of biotin (1.5 γ/liter) and Casamino acid (0.1%), and the several batches were inoculated and cultured as described in that example. The glutamic acid concentration in each batch and in a blank was determined after 24 hours, and the results obtained are listed in the table as the percentage yield, based on the acetate originally present.

TABLE 1

| Sulfur source: | Concentration, percent | Yield |
|---|---|---|
| None | | 20.2 |
| L-cystine | 0.05 | 38.6 |
| L-cysteine | 0.05 | 38.6 |
| DL-homocystine | 0.1 | 33.9 |
| DL-homocysteine | 0.1 | 27.2 |
| L-methionine | 0.02 | 29.8 |
| Sodiumthioglycolate | 0.02 | 25.9 |
| β-mercaptoethanol | 0.02 | 26.7 |
| Thiourea | 0.02 | 28.6 |

As is evident from Table 1, the yield-improving effect of added assimilable sulfur sources is not limited to sulfur bearing amino acids although the amino acids generally are more effective than other sulfur sources.

EXAMPLE 5

A culture medium was prepared from the following ingredients:

Ammonium acetate: 1.0%
Sodium acetate: 1.0%
Glucose (starch hydrolyzate): 1.5%
Thiamine hydrochloride: 200 γ/liter
Biotin: 2 γ/liter
Aji-eki: 1 ml./dl.
$KH_2PO_4$: 0.1%
$MgSo_4 \cdot 7 H_2O$: 0.04%
$FeSo_4 \cdot 7 H_2O$: 0.001%
$MnSO_4$: 0.001%
Urea: 0.4%
L-cystine: 0.03%
DL-methionine: 0.03%

Three liters of the medium were placed in a 5-liter jar fermenter, sterilized, and inoculated with *Brevibacterium lactofermentum* as in Example 1. The medium was then agitated under aerobic conditions at 31° C. for 24 hours. When the microorganisms had grown to produce significant amounts of L-glutamic acid, a solution containing equal amounts of acetic acid and ammonium acetate was continuously fed to the medium at a rate to keep the pH between 7.8 and 8.0. The total amount of acetate ions added over a cultivation period of 39 hours was 12.31 g./dl., and the glutamic acid concentration reached 7.35 g./dl.

If it is assumed that the glucose present was converted to glutamic acid at a yield of 50%, the yield from the acetate was 53.6%. 165 g./crude L-glutamic acid crystals were recovered from the medium in a conventional manner by removing the microbial cells and adjusting the pH of the remaining liquid to 3.2.

When the same procedure was repeated with a medium free from added cystine and methionine under otherwise identical conditions, the yield based on acetate was only 43.9%.

EXAMPLE 6

The procedure of Example 5 was repeated with minor changes with other microorganisms known to produce glutamic acid by fermentation on acetate media. Two nutrient media were employed with each microorganism, Medium A containing 0.05% L-cystine in addition to the ingredients of Medium B which had the following composition:

Ammonium acetate: 1.0%
Sodium acetate: 1.0%
Ammonium sulfate: 0.5%
$KH_2PO_4$: 0.1%
$MgSO_4 \cdot 7H_2O$: 0.4%
$Fe^{++}$, $Mn^{++}$ (each): 2 p.p.m.
Thiamine-HCl: 200 γ/liter
Biotin: 1.5 γ/liter
Casamino acid (DIFCO): 0.2%
pH: 7.5

Table 2 lists for each strain tested the concentration of L-glutamic acid (GA), the yield in percent of the acetate ion supplied, and acetic acid or acetate (Ac.ac.) consumed over a cultivation period of 40 hours in Media A and B. While the several strains of microorganisms differ greatly from each other in their ability of accumulating L-glutamic acid in the media used, the ratio of ultimate glutamic acid concentration between Medium A and Medium B is practically the same for all microorganisms, and the effect of the sulfur-bearing addition agents of the invention is unrelated to the specific nature of the employed microorganisms capable of converting acetate ion to glutamic acid.

TABLE 2

| Microorganism | Medium A | | | Medium B | | |
|---|---|---|---|---|---|---|
| | GA g./dl. | Yield, percent | Ac.ac. g./dl. | GA g./dl. | Yield, percent | Ac.ac. g./dl |
| *Brev. flavum* No. 2247 (ATCC 14067) | 4.81 | 46.0 | 10.46 | 2.89 | 34.9 | 8.29 |
| *Brev. roseum* No. 7 ATCC 13825 | 5.02 | 49.1 | 10.23 | 2.97 | 35.1 | 8.47 |
| *Brev. Saccharolyticum* No. 7636 (ATCC 14066) | 3.54 | 45.9 | 7.72 | 2.12 | 31.3 | 6.78 |
| *Micrococcus glutamicus* No. 541 (ATCC 13058) | 3.75 | 44.5 | 8.43 | 2.63 | 33.8 | 7.79 |
| *Cory. acetoacidophilum* No. 410 (ATCC 13870) | 3.80 | 44.4 | 8.55 | 2.29 | 29.2 | 7.85 |
| *Cory. lilium* (NRRL 2243) | 3.90 | 42.7 | 9.13 | 2.38 | 28.9 | 8.24 |
| *Cory. herculis* (ATCC 13868) | 4.17 | 42.5 | 9.81 | 2.59 | 29.9 | 8.66 |
| *Arthrobacter citreus* 23-2A (ATCC 17775) | 2.01 | 46.8 | 4.29 | 1.07 | 31.0 | 3.45 |

While the invention has been described with particular reference to specific embodiments, it is to be understood that it is not limited thereto, but is to be construed broadly and restricted solely by the scope of the appended claims.

What is claimed is:

1. In a process of producing L-glutamic acid by aerobically culturing microorganism capable of utilizing acetate ions as a carbon source in the fermentative production of said glutamic acid on a nutrient medium containing said acetate ions as the principal source of assimilable carbon, the improvement which comprises:
    (a) adding to said medium an amount of an assimilable source of sulfur effective to increase the yield of said glutamic acid.

2. In a process as set forth in claim 1, said source of sulfur being added to said medium in an amount of 0.005 to 2 percent.

3. In a process as set forth in claim 2, said source of sulfur being a member of the group consisting of cystine, cysteine, homocystine, homocysteine, methionine, thioglycolic acid, β-mercaptoethanol, thiourea, and mixtures thereof.

4. In a process as set forth in claim 3, said source of sulfur being an amino acid.

5. In a process as set forth in claim 4, said source of sulfur being added to said medium in an amount of 0.05 to 0.5 percent.

References Cited

UNITED STATES PATENTS

| 2,953,499 | 9/1960 | Katagiri et al. | 195—47 |
| 3,117,915 | 1/1964 | Shiio et al. | 195—30 |
| 3,335,065 | 8/1967 | Tanaka et al. | 195—30 |

OTHER REFERENCES

Chemical Abstracts, vol. 64, No. 15038a, b, 1964.

A. LOUIS MONACELL, Primary Examiner

G. M. NATH, Assistant Examiner